United States Patent
Chuang et al.

(10) Patent No.: US 12,030,139 B2
(45) Date of Patent: Jul. 9, 2024

(54) Sn—Cu MIXED ALLOY SOLDER PASTE, METHOD OF MAKING THE SAME AND SOLDERING METHOD

(71) Applicant: Robert Bosch GmbH, Stuttgart (DE)

(72) Inventors: Wallace Chuang, Taipei (TW); Eckart Schellkes, Kirchentellinsfurt (DE); Yee-Wen Yen, Taipei (TW); Chia-Yu Liu, Taipei (TW)

(73) Assignee: Robert Bosch GmbH, Stuttgart (DE)

( * ) Notice: Subject to any disclaimer, the term of this patent is extended or adjusted under 35 U.S.C. 154(b) by 469 days.

(21) Appl. No.: 17/602,046

(22) PCT Filed: Oct. 30, 2019

(86) PCT No.: PCT/EP2019/079580
§ 371 (c)(1),
(2) Date: Oct. 7, 2021

(87) PCT Pub. No.: WO2020/089258
PCT Pub. Date: May 7, 2020

(65) Prior Publication Data
US 2022/0395934 A1 Dec. 15, 2022

(30) Foreign Application Priority Data
Oct. 31, 2018 (CN) .......................... 201811285893.3

(51) Int. Cl.
*B23K 35/26* (2006.01)
*B23K 35/02* (2006.01)
(Continued)

(52) U.S. Cl.
CPC .......... *B23K 35/262* (2013.01); *B23K 35/025* (2013.01); *C22C 12/00* (2013.01); *C22C 13/00* (2013.01)

(58) Field of Classification Search
CPC .... B23K 35/025; B23K 35/26; B23K 35/262; B23K 35/0244; C22C 13/00
See application file for complete search history.

(56) References Cited

U.S. PATENT DOCUMENTS 4,487,638 A * 12/1984 Hoge ...................... H01L 24/83
228/123.1
5,328,521 A * 7/1994 Keusseyan ........... B23K 35/268
148/22

(Continued)

FOREIGN PATENT DOCUMENTS

JP 2002-126893 A 5/2002
JP 2018058090 A * 4/2018

OTHER PUBLICATIONS

International Search Report corresponding to PCT Application No. PCT/EP2019/079580, mailed Dec. 17, 2019 (English language document) (3 pages).

*Primary Examiner* — Erin B Saad
*Assistant Examiner* — Carlos J Gamino
(74) *Attorney, Agent, or Firm* — Maginot, Moore & Beck LLP

(57) ABSTRACT

A solder paste includes a first solder alloy powder in an amount ranging from 30% to 95% by weight. The first solder alloy powder includes a first solder alloy with a solidus temperature of 200° C. to 260° C. The first solder alloy includes an Sn—Cu alloy or an Sn—Cu—Ag alloy. The solder paste further includes a second solder alloy powder in an amount ranging from 5% to 70% by weight, and a solder flux. The second solder alloy powder includes a second solder alloy with a solidus temperature below 250° C. The solder paste has a variable melting point. In multiple reflow soldering, a remelting of the solder paste is inhibited under different temperature conditions so that no functional failure (Continued)

occurs during assembly and/or packaging of PCBs or electronic devices due to melting of solder.

14 Claims, 3 Drawing Sheets

(51) Int. Cl.
    *C22C 12/00*     (2006.01)
    *C22C 13/00*     (2006.01)

(56) References Cited

U.S. PATENT DOCUMENTS

| | | | | |
|---|---|---|---|---|
| 5,540,379 A * | 7/1996 | Kazem-Goudarzi | ......................... | |
| | | | B23K 35/0244 | |
| | | | 228/248.5 | |
| 6,214,131 B1 * | 4/2001 | Hua | ................. B23K 35/025 | |
| | | | 75/252 | |
| 6,596,094 B2 * | 7/2003 | Ochiai | ................. H05K 3/3485 | |
| | | | 428/553 | |
| 7,017,795 B2 * | 3/2006 | Liu | ................. H05K 3/3485 | |
| | | | 228/248.1 | |
| 7,169,209 B2 * | 1/2007 | Nakata | ................. B22F 3/1035 | |
| | | | 428/580 | |
| 8,961,709 B1 * | 2/2015 | Takaura | ............... H05K 3/3485 | |
| | | | 75/255 | |
| 9,301,403 B2 * | 3/2016 | Yamashita | ......... B23K 35/0244 | |
| 9,636,784 B2 * | 5/2017 | Zhang | ................. H05K 3/3485 | |
| 11,267,080 B2 * | 3/2022 | Zhang | ................. B23K 1/0016 | |
| 11,819,915 B2 * | 11/2023 | Washizuka | ............... B23K 1/19 | |
| 2002/0012607 A1 * | 1/2002 | Corbin | ................. B23K 35/288 | |
| | | | 420/457 | |
| 2002/0040624 A1 * | 4/2002 | Nakamura | ........... B23K 35/262 | |
| | | | 75/252 | |
| 2002/0114726 A1 * | 8/2002 | Soga | ................. H01L 23/4924 | |
| | | | 257/E23.105 | |
| 2004/0217152 A1 * | 11/2004 | Taguchi | ............... B23K 35/262 | |
| | | | 228/248.1 | |
| 2005/0029666 A1 * | 2/2005 | Kurihara | ................. H01L 24/81 | |
| | | | 257/772 | |
| 2010/0291399 A1 * | 11/2010 | Kato | ....................... H01L 23/06 | |
| | | | 228/141.1 | |
| 2011/0180311 A1 * | 7/2011 | Tsuda | ...................... C22C 13/00 | |
| | | | 420/560 | |
| 2011/0268985 A1 | 11/2011 | Zhang et al. | | |
| 2013/0233618 A1 * | 9/2013 | Nakano | ................. C22C 1/0483 | |
| | | | 228/101 | |
| 2014/0193650 A1 * | 7/2014 | Nakano | ................. H05K 3/3463 | |
| | | | 228/101 | |
| 2014/0199115 A1 * | 7/2014 | de Avila Ribas | .. B23K 35/3033 | |
| | | | 228/56.3 | |
| 2022/0395936 A1 * | 12/2022 | Geng | ................. B23K 35/025 | |

* cited by examiner

Sn—Cu MIXED ALLOY SOLDER PASTE, METHOD OF MAKING THE SAME AND SOLDERING METHOD

This application is a 35 U.S.C. § 371 National Stage Application of PCT/EP2019/079580, filed on Oct. 30, 2019, which claims the benefit of priority to Serial No. CN 201811285893.3, filed on Oct. 31, 2018 in China, the disclosures of which are incorporated herein by reference in their entirety.

The disclosure relates to a soldering technology and more particularly to a reflow soldering technology using a mixed alloy solder paste.

BACKGROUND

In the packaging process of sensors based on MEMS (Micro-Electro-Mechanical System) technology, welding (reflow soldering) must be performed a plurality of times. For example, high-temperature solder is used to solder a silicon chip to a lead frame to form an assembly in the first-stage packaging. The packaged or unpackaged silicon chip/lead frame assembly is attached to a PCB using reflow soldering in the subsequent second-stage packaging. A soldering point formed after the cooling of the first-stage reflow soldering can also be remelted in the second-stage packaging, causing various problems. For example, bridging may occur between different soldering points, resulting in product failure. Therefore, a new technical solution to this problem must be sought.

SUMMARY

Against the deficiency of the prior art, the purpose of the disclosure is to solve the problem of bridging between soldering points caused by the melting of solder paste in the process of soldering performed a plurality of times. The disclosure adopts the following technical solution for the preceding purpose:

a solder paste, characterized in that the solder paste comprises:
a first solder alloy powder in an amount ranging from 30% to 95% by weight, the first solder alloy powder including a first solder alloy with a solidus temperature of 200° C. to 260° C., the first solder alloy including an Sn—Cu alloy or Sn—Cu—Ag alloy;
a second solder alloy powder in an amount ranging from 5% to 70% by weight, the second solder alloy powder including a second solder alloy with a solidus temperature below 250° C.; and a solder flux.

Preferably, the second solder alloy includes an Sb or Sn alloy.

Preferably, the Sn alloy includes an Sn—Ag or Sn—Cu alloy.

Preferably, the Sn alloy includes an Sn—Ag—Cu alloy.

Preferably, the Sn alloy includes an Sn—Ag—Cu—Y alloy, where Y is Al, Au, Co, Ga, Ge, In, Mn, Ni, P, Pd, Pt, Sb, or Zn.

Preferably, the second solder alloy includes at least one of Cu and Sn, the second solder alloy including, by weight, 0%-3% of Cu, and 0%-4% of Ag, with the remainder being Sn or Sn and other additives, the additives being at least one of Al, Au, Co, Ga, Ge, In, Mn, Ni, P, Pd, Pt, Sb, or Zn.

Preferably, the first solder alloy includes 10%-50% of Cu, and 0%-4% of Ag, and the remainder is Sn.

According to another aspect of the disclosure, there is provided a method of making a solder paste, wherein the method of making a solder paste comprises mixing the solder paste.

According to yet another aspect of the disclosure, there is provided a soldering method, wherein the soldering method comprises:
applying the solder paste between a first device and a second device;
heating to melt the solder paste using the reflow soldering process to form a soldering seam connecting the first device and the second device, the first device and the second device forming a soldering assembly.

Preferably, the soldering method comprises inhibiting any remelting of the soldering seam when the soldering assembly and other devices are soldered in a further reflow soldering process.

It can be seen from the preceding contents that the mixed alloy solder paste according to an embodiment of the disclosure has a variable melting point in the soldering performed a plurality of times. In multiple reflow soldering, the remelting of solder paste can be inhibited under different temperature conditions accordingly. Therefore, no functional failure will occur during the assembly and/or packaging of PCBs or electronic devices due to bridging caused by the melting of solder paste.

BRIEF DESCRIPTION OF THE DRAWINGS

The characteristics, features, advantages, and benefits of the disclosure will become apparent from the following detailed description in conjunction with the accompanying drawings.

DETAILED DESCRIPTION

In conjunction with the accompanying drawings, the embodiments of the disclosure will be further described below. It is important to note that the embodiments provide detailed modes of execution and specific operating processes on the premise of the disclosure, but the scope of protection of the disclosure is not limited to the embodiments.

The disclosure relates to a solder paste comprising a mixture of different solder alloys and a solder flux. The solder paste is used to solder different devices. The solder paste comprises two or more solder alloys or metals mixed with a solder flux material. The first solder alloy or metal will form the body of a soldering seam during the reflow. The second solder alloy or metal or any additional solder alloy or metal is selected according to the chemical reaction of devices to be soldered or the affinity to the first solder alloy. The melting temperature Tm(B) of the second solder alloy is lower than the melting temperature Tm(A) of the first solder alloy. The second solder alloy melts and spreads to devices to be soldered during the reflow soldering. When the first solder alloy melts, the existence of the second solder alloy helps place the melted first solder alloy onto devices to be soldered. The second solder alloy is used to be completely converted into an Intermetallic Compound (IMC) and produces the least or no low-melting-point phase in the final soldering seam. Additives in the solder paste are used to improve reaction chemistry during the reflow, better the wettability, control the IMC thickness, and enhance the bonding strength.

Figure 1:
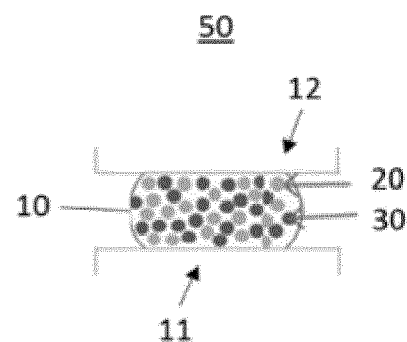
FIG. 1 shows a distribution of a mixed alloy powder of the mixed alloy solder paste according to an embodiment of the disclosure.

FIG. 1 shows a schematic diagram of a distribution of a metal powder of the mixed alloy solder paste used according to an embodiment of the disclosure before and after the reflow soldering. FIG. 1 shows that the mixed alloy solder paste 10 is located between the first device 11 and the second device 12 of the soldering assembly 50. In this embodiment, the first device 11 is a metal substrate such as a Cu substrate and the second device 12 is a soldered element such as a logic chip ASIC. The mixed solder paste 10 includes particles of the first solder alloy 30 and second solder alloy 20 suspended in the solder flux. An appropriate second solder alloy 20 can be selected according to the chemical reaction between the solder paste 10 and the first device 11. The mixed alloy solder paste 10 is applied to the first device 11.

During the reflow soldering, the temperature of the soldering assembly 50 first rises above the melting temperature Tm(B) of the second solder alloy 20. The second solder alloy 20 melts and spreads around the first solder alloy particles that are still in the solid state on the first device 11. The surface chemical reaction of the second solder alloy 20 contributes to the wetting of the second solder alloy 20 on the first device 11. It also causes the formation of an IMC layer between the melted second solder alloy 20 and the first device 11. The IMC layer is mainly controlled by the amount of the second solder alloy 20 of the initial solder paste 10.

The second solder alloy 20 is designed to have a good affinity to the first solder alloy 30. In some embodiments, the affinity causes part of the first solder alloy 30 to dissolve in the melted second solder alloy 20 to form a mixture of the first solder alloy 30 and the second solder alloy 20.

As the temperature continues to rise above the melting temperature Tm(A) of the first solder alloy 30 during the reflow soldering process, the first solder alloy 30 melts to form a solution of the first solder alloy 30 and the second solder alloy 20, which wets the IMC layer. As the soldering assembly 50 remains above Tm(A), the second solder alloy 20 is removed from the solution, the IMC layer is increased, and the melted first solder alloy 30 remains. In some other embodiments, in addition to forming an IMC layer, excessive components from the second solder alloy 20 are incorporated into the IMC together with components from the first solder alloy 30. The affinity between the first solder alloy 30 and the second solder alloy 20 helps improve the wettability of the first solder alloy 30 on the IMC layer, thus enhancing the bonding strength.

Technicians in this field shall understand that, in some other embodiments, the temperature continues to rise but does not reach and exceed the melting temperature Tm(A) of the first solder alloy 30 during the reflow soldering process. At this moment, the first solder alloy 30 does not finish melting, but in the condition of the solder alloy 20 being completely dissolved, the first solder alloy 30 is partly dissolved into the solution of the second solder alloy 20, which wets the IMC layer. In addition, components from the second solder alloy 20 are incorporated into the IMC together with components from the partly dissolved first solder alloy 30.

Figure 2:
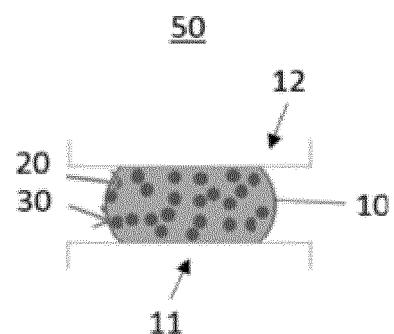
FIG. 2 shows a distribution of a mixed alloy powder of the mixed alloy solder paste according to an embodiment of the disclosure after the reflow soldering.

As the soldering assembly 50 cools down during the reflow soldering process, a solder bump or soldering seam is formed on the first device 11 that binds to the IMC. This IMC binds to the solidified first solder alloy 30. In addition, a homogeneous soldering seam with an improved bonding interface is formed after solidification. Particles of the first solder alloy 30 are randomly suspended in the solder bump or soldering seam after the reflow soldering, as shown in FIG. 2.

A solder bump or soldering seam produced by the use of a solder paste consisting of the elements of the mixed alloy 10, especially the first solder alloy 30 and the second solder alloy 20, show better properties than a solder bump or soldering seam produced by the use of a solder paste containing a single solder alloy.

In this embodiment, the mixed alloy solder paste 10 includes an Sn—Cu or Sn—Cu—Ag alloy as the first solder alloy 30 and Sn or an Sn alloy as the second solder alloy 20. The Sn alloy includes an Sn—Ag alloy, an Sn—Cu alloy or an Sn—Ag—Cu alloy or an Sn—Ag—Cu—Y alloy, where Y is Al, Au, Co, Ga, Ge, In, Mn, Ni, P, Pd, Pt, Sb, or Zn. In addition, the mixed alloy solder paste includes a powder of the first solder alloy 30 in an amount ranging from 30 wt % to 95 wt % and a powder of the second solder alloy 20 in an amount ranging from 5 wt % to 70 wt %. The Sn—Cu alloy of the first solder alloy 30 has a solidus temperature of 200° C. to 260° C. The Sn or Sn alloy of the second solder alloy 20 has a solidus temperature below 250° C. The Sn or Sn alloy has a lower melting temperature than the Sn—Cu or Sn—Cu—Ag alloy. The mixed alloy solder paste in this embodiment can be used, for example, in a field that needs to use the multiple reflow soldering process for surface mounting of electronic devices on PCBs. For example, in the packaging process of sensors based on MEMS technology, it is necessary to perform the chip-level packaging of sensing elements, followed by the device-level and system-level packaging. The mixed solder paste in this embodiment is preferably used in the chip-level packaging. The maximum temperature for reflow soldering is generally 250° C. in the chip-level packaging.

Figure 3:
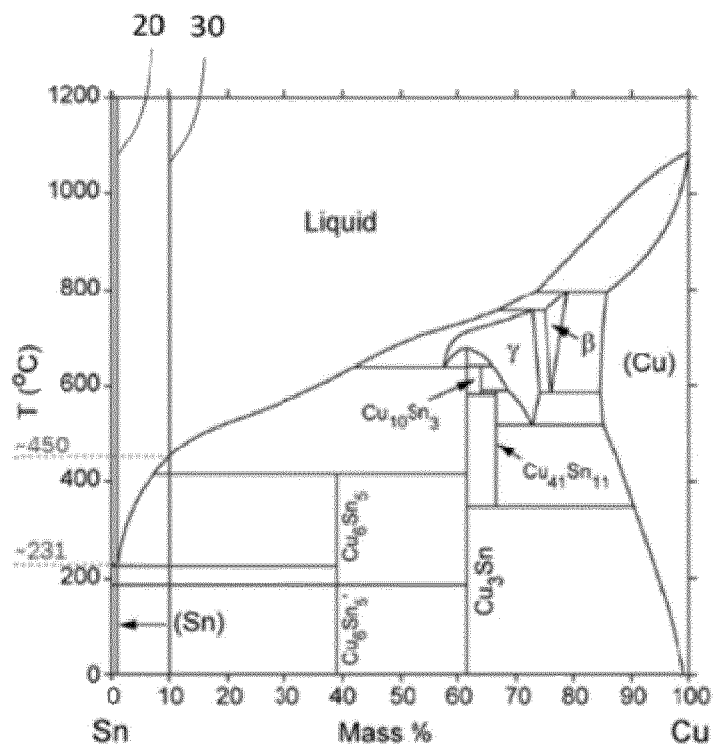
FIG. 3 shows an Sn—Cu binary phase diagram of the mixed alloy solder paste according to an embodiment of the disclosure.

By referring to the Sn—Cu binary phase diagram of FIG. 3, the mixed alloy solder paste in this embodiment includes, for example, 50% by weight of the first solder alloy powder and 50% by weight of the second solder alloy powder. The first solder alloy 30 is an Sn—Cu alloy that has a liquidus temperature of about 450° C. Specifically, the first solder alloy 30 includes 90 wt % of Sn and 10% by weight of Cu (Sn-10Cu). The second solder alloy 20 is an Sn—Ag—Cu alloy that has a liquidus temperature of about 231° C. Specifically, the second solder alloy 20 includes 96.5 wt % of Sn, 3 wt % of Ag, and 0.5 wt % of Cu (SAC305).

In the chip-level packaging of the MEMS sensor, the mixed alloy solder paste 10 is applied between the Cu substrate of the first device 11 and the MEMS sensing element. The temperature rises during the reflow soldering. When the temperature reaches and exceeds the melting temperature of the powder of the second solder alloy 20 of the mixed alloy paste 10, the powder of the second solder alloy 20 completely melts to form an Sn-containing IMC layer on the surface of the Cu substrate of the first device 11.

The good affinity between Cu and Sn ensures that the melted Cu has a good adhesion to the Sn-containing IMC layer.

When the reflow soldering temperature rises to a temperature required for the chip-level packaging of MEMS sensors such as 250° C., it does not reach the melting temperature of the powder of the first solder alloy 30. At this moment, under the condition of the solder alloy 20 being completely melted, the first solder alloy 30 is partly dissolved into the solution of the second solder alloy 20, which wets the IMC layer. In addition, components from the completely melted second solder alloy 20 are incorporated into the IMC together with components from the partly dissolved first solder alloy 30. Specifically, the first solder alloy 30 partially dissolves to release Cu, which will dissolve into the solution of the completely melted second solder alloy 20. Cu released from partial dissolution of the first solder alloy 30 is also incorporated into the IMC together with components from the second solder alloy 20. In addition, the existence of Ag in the second solder alloy 20 converts any excessive Sn released from the partial dissolution of the first solder alloy 30 into Ag3Sn IMC existing in the solder body.

As the assembly cools down during the reflow soldering process, a solder bump or soldering seam is formed on the Cu substrate of the first device 11 that binds to the IMC. This IMC binds to the solidified first solder alloy 30. In addition, a homogeneous soldering seam with an improved bonding interface is formed after solidification. At this moment, the melting point of the solder bump or soldering seam rises due to the addition of Cu. Therefore, when the next level of packaging of MEMS sensors such as device-level or system-level packaging is performed and the temperature required for reflow soldering is reached, the solder bump or soldering seam with an elevated melting point is difficult to melt or melts slowly. The manufacturing of MEMS sensors is finished after multiple reflow soldering.

In an embodiment of the disclosure, the first solder alloy 30 includes 10 wt %-50 wt % of Cu, and 0 wt %-4 wt % of Ag, with the remainder being Sn.

In an embodiment of the disclosure, the second solder alloy 20 includes at least one of Cu and Ag, for example, 0 wt %-3 wt % of Cu, 0 wt %-4 wt % of Ag, and the remainder being Sn or Sn and other additives such as Al, Au, Co, Ga, Ge, In, Mn, Ni, P, Pd, Pt, Sb, or Zn.

Figure 4:
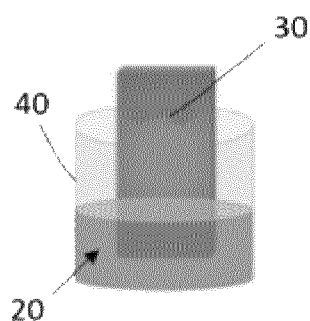
FIG. 4 shows a schematic diagram of a device for the soaking experiment on the mixed alloy solder paste according to an embodiment of the disclosure.
Figure 5:
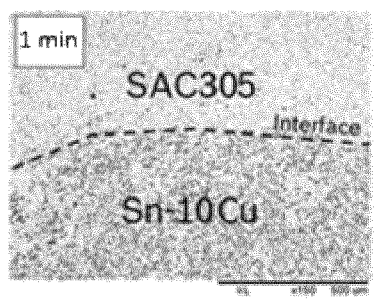
FIG. 5 shows an imaging diagram of the mixed alloy solder paste according to an embodiment of the disclosure under a scanning electron microscope after 1 minute of the soaking experiment.
Figure 6:
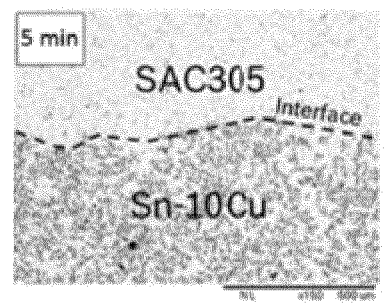
FIG. 6 shows an imaging diagram of the mixed alloy solder paste according to an embodiment of the disclosure under a scanning electron microscope after 5 minutes of the soaking experiment.

FIGS. 4, 5, and 6 show a device diagram for the soaking experiment on the mixed alloy solder paste 10 and imaging diagrams of the cross section of the mixed alloy solder paste 10 under a scanning electron microscope after the soaking experiment. In FIG. 4, the second solder alloy 20 is heated to a temperature of complete melting in the quartz crucible 40, such as 250° C., and then the 1 mm thick strip first solder alloy 30 is placed in the completely melted second solder alloy 20 for wetting and soaking. After soaking for 1 minute and 5 minutes, respectively, the quartz crucible 40 is cooled, and then the first solder alloy 30 and the second solder alloy 20 are cooled to form a mixture. FIGS. 5 and 6 show section views of the cooled mixture scanned by a scanning electron microscope. From FIGS. 5 and 6, a clear dividing line can be seen in the mixture of the cooled first solder alloy 30 and second solder alloy 20. This proves that the first solder alloy 30 does not melt at 250° C. Meanwhile, the first solder alloy 30 partially dissolves and releases Cu at 250° C.

On the other hand, the embodiment of the disclosure provides a method of making the preceding mixed alloy solder paste 10. The method comprises forming particles of the first solder alloy 30 and second solder alloy 20 grain and then mixing particles of the first solder alloy 30 and second solder alloy 20 particles and the solder flux to form a mixed alloy solder paste 10. The final mixed alloy solder paste 10 includes a powder of the first solder alloy 30, and a powder of the second solder alloy 20, with the remainder being solder flux. The first solder alloy 30 is an alloy that has a liquidus temperature of 200° C.-260° C. In this embodiment, the first solder alloy 30 is an Sn—Cu or Sn—Cu—Ag alloy.

Furthermore, the second solder alloy 20 is an alloy that has a liquidus temperature below 250° C. In this embodiment, the second solder alloy 20 is Sn or an Sn alloy. Specifically, the Sn alloy includes an Sn—Ag, Sn—Cu, or Sn—Ag—Cu alloy. In this embodiment, the mixed alloy solder paste 10 includes 30 wt % to 95 wt % of a powder of the first solder alloy 30 and 5 wt % to 70 wt % of a powder of the second solder alloy 20.

Furthermore, the first solder alloy 30 includes 10 wt %-50 wt % of Cu, and 0 wt %-4 wt % of Ag, with the remainder being Sn.

Furthermore, the second solder alloy 20 includes at least one of Cu and Ag, for example, 0 wt %-3 wt % of Cu, 0 wt %-4 wt % of Ag, and the remainder being Sn or Sn and other additives such as Al, Au, Co, Ga, Ge, In, Mn, Ni, P, Pd, Pt, Sb, or Zn.

In the further embodiment, powder of the second solder alloy 20 includes powder consisting of a plurality of types of powder. For example, powder of the second solder alloy 20 includes a mixture of alloys other than the alloys described in this embodiment. In some embodiments, the relative amount of the first solder alloy 30 and second solder alloy 20 in the mixture paste 10 is determined according to the solder application According to the preceding embodiments of the disclosure, a mixed alloy solder paste with a variable melting point is provided. During the reflow soldering process, the solder bump or soldering seam formed after the cooling of the solder paste has a higher melting point than that before the reflow soldering so that the remelting of the solder bump or soldering seam can be inhibited in the multiple reflow soldering, which helps the high-temperature solder withstand multiple reflow without causing any functional failure. Technicians in this field shall understand that the melting fluidity of the mixed alloy solder paste depends on the mixing ratio of the melted part to non-melted part of the mixed alloy solder paste, and so the melting fluidity of the mixed alloy solder paste can be adjusted to adapt to different usage scenarios.

Technicians in this field can make various corresponding changes and modifications according to the preceding technical solution and conception, and all of such changes and modifications shall be included in the scope of protection of the claims of the disclosure.

The invention claimed is:

1. A solder paste, comprising:
   a powder and solder flux,
   wherein the powder comprises:
   (i) a first solder alloy powder in an amount ranging from 30% to 95% by weight, the first solder alloy powder including a first solder alloy with a solidus temperature of 200° C. to 260° C., the first solder alloy including an Sn—Cu alloy or an Sn—Cu—Ag alloy, and the first solder alloy including by weight, 10%-50% of Cu, and 0%-4% of Ag, with a remainder being Sn, and
   (ii) a second solder alloy powder in an amount ranging from 5% to 70% by weight, and the second solder alloy powder including a second solder alloy with a solidus temperature below 250° C.

2. The solder paste according to claim 1, wherein the second solder alloy includes an Sb alloy or an Sn alloy.

3. The solder paste according to claim 1, wherein the second solder alloy includes an Sn—Ag alloy or an Sn—Cu alloy.

4. The solder paste according to claim 1, wherein the second solder alloy includes an Sn—Ag—Cu alloy.

5. The solder paste according to claim 1, wherein:
the second solder alloy includes an Sn—Ag—Cu—Y alloy, and
Y is Al, Au, Co, Ga, Ge, In, Mn, Ni, P, Pd, Pt, Sb, or Zn.

6. The solder paste according to claim 1, wherein:
the second solder alloy includes at least one of Cu and Sn,
the second solder alloy includes, by weight, 0%-3% of Cu, and 0%-4% of Ag, with a remainder being Sn or Sn and other additives, and
the other additives include at least one of Al, Au, Co, Ga, Ge, In, Mn, Ni, P, Pd, Pt, Sb, and Zn.

7. A method of making a solder paste, comprising:
mixing alloy powders with flux,
wherein:
the mixing of alloy powders comprises mixing a first solder alloy powder in an amount ranging from 30% to 95% by weight and a second solder alloy powder in an amount ranging from 5% to 70% by weight,
the first solder alloy powder includes a first solder alloy with a solidus temperature of 200° C. to 260° C., the first solder alloy includes an Sn—Cu alloy or an Sn—Cu—Ag alloy, and the first solder alloy includes by weight, 10%-50% of Cu, and 0%-4% of Ag, with a remainder being Sn, and
the second solder alloy powder includes a second solder alloy with a solidus temperature below 250° C.

8. A soldering method, comprising:
applying a solder paste between a first device with a copper substrate and a second device of a chip element;
heating to melt the applied solder paste using a reflow soldering process to form a soldering seam connecting the copper substrate and the second device, the first device and the second device forming a soldering assembly; and
heating again using said reflow soldering process to solder said soldering assembly with another device,
wherein the solder paste comprises:
a powder and solder flux, and
wherein the powder comprises:
(i) a first solder alloy powder in an amount ranging from 30% to 95% by weight, the first solder alloy powder including a first solder alloy with a solidus temperature of 200° C. to 260° C., the first solder alloy including an Sn—Cu alloy or an Sn—Cu—Ag alloy, and the first solder alloy including by weight, 10%-50% of Cu, and 0%-4% of Ag, with a remainder being Sn, and
(ii) a second solder alloy powder in an amount ranging from 5% to 70% by weight, and the second solder alloy powder including a second solder alloy with a solidus temperature below 250° C.

9. The soldering method according to claim 8, further comprising:
inhibiting any remelting of the soldering seam during the heating again.

10. The method according to claim 8, wherein the second solder alloy includes an Sb alloy or an Sn alloy.

11. The method according to claim 10, wherein the second solder alloy includes an Sn—Ag alloy or an Sn—Cu alloy.

12. The method according to claim 11, wherein the second solder alloy includes an Sn—Ag—Cu alloy.

13. The method according to claim 12, wherein:
the second solder alloy includes an Sn—Ag—Cu—Y alloy, and
Y is Al, Au, Co, Ga, Ge, In, Mn, Ni, P, Pd, Pt, Sb, or Zn.

14. The method according to claim 8, wherein:
the second solder alloy includes, by weight, 0%-3% of Cu, and 0%-4% of Ag, with a remainder being Sn or Sn and other additives, and
the other additives include at least one of Al, Au, Co, Ga, Ge, In, Mn, Ni, P, Pd, Pt, Sb, and Zn.

* * * * *